US008589825B2

(12) United States Patent
Wang

(10) Patent No.: US 8,589,825 B2
(45) Date of Patent: Nov. 19, 2013

(54) COMMUNICATION APPLICATION TRIGGERING METHOD AND ELECTRONIC DEVICE

(71) Applicant: Huawei Technologies Co., Ltd., Guangdong (CN)

(72) Inventor: Ziyi Wang, Hangzhou (CN)

(73) Assignee: Huawei Technologies Co., Ltd., Sehnzhen (CN)

( * ) Notice: Subject to any disclaimer, the term of this patent is extended or adjusted under 35 U.S.C. 154(b) by 0 days.

(21) Appl. No.: 13/722,792

(22) Filed: Dec. 20, 2012

(65) Prior Publication Data
US 2013/0222292 A1 Aug. 29, 2013

Related U.S. Application Data

(63) Continuation of application No. PCT/CN2012/075923, filed on May 23, 2012.

(30) Foreign Application Priority Data

Feb. 28, 2012 (CN) .......................... 2012 1 0047867

(51) Int. Cl.
G06F 3/033 (2013.01)
(52) U.S. Cl.
USPC .......................................... 715/863; 345/173
(58) Field of Classification Search
USPC ........... 715/863, 710, 767, 821, 864; 345/173
See application file for complete search history.

(56) References Cited

U.S. PATENT DOCUMENTS 5,787,440 A * 7/1998 Bakke et al. ........................ 1/1
(Continued)

FOREIGN PATENT DOCUMENTS

CN 101094240 A 12/2007
CN 101482796 A 7/2009
(Continued)

OTHER PUBLICATIONS

Partial translation of International Search Report dated Dec. 13, 2012 in connection with International Patent Application No. PCT/CN2012/075923.

(Continued)

Primary Examiner — Phenuel Salomon

(57) ABSTRACT

The present invention discloses a communication application triggering method and an electronic device. A communication application triggering method is applied to an electronic device that has a touch sensor, where the method includes: detecting a touch track or touch point on the touch sensor after an object is selected or is called; and matching the detected touch track or touch point with at least one standard model; and if the matching is successful, and the object can be used as a sent object of a communication application that corresponds to the successfully matched standard model, triggering the communication application that corresponds to the successfully matched standard model, and adding the object as a to-be-sent object of the communication application, where different communication applications correspond to different standard models. Technical solutions of embodiments of the present invention are useful for simplifying a communication application triggering mechanism and improving user experience.

6 Claims, 13 Drawing Sheets

(56) References Cited

U.S. PATENT DOCUMENTS

| | | | |
|---|---|---|---|
| 6,262,735 B1 * | 7/2001 | Etelapera | 715/854 |
| 7,587,683 B2 * | 9/2009 | Ito et al. | 715/823 |
| 7,966,578 B2 | 6/2011 | Tolmasky et al. | |
| 8,139,038 B2 * | 3/2012 | Chueh et al. | 345/173 |
| 2004/0116167 A1 * | 6/2004 | Okuzako et al. | 455/575.3 |
| 2006/0062203 A1 | 3/2006 | Satapati | |
| 2006/0224694 A1 * | 10/2006 | Lai | 709/217 |
| 2007/0277124 A1 * | 11/2007 | Shin et al. | 715/863 |
| 2008/0182627 A1 * | 7/2008 | Lincoln | 455/566 |
| 2008/0254837 A1 * | 10/2008 | Klinghult et al. | 455/566 |
| 2009/0228792 A1 * | 9/2009 | Van Os et al. | 715/702 |
| 2009/0278806 A1 * | 11/2009 | Duarte et al. | 345/173 |
| 2010/0004031 A1 * | 1/2010 | Kim | 455/566 |
| 2010/0085318 A1 | 4/2010 | Lee et al. | |
| 2012/0079423 A1 * | 3/2012 | Bender et al. | 715/804 |
| 2012/0120105 A1 * | 5/2012 | Honda | 345/634 |

FOREIGN PATENT DOCUMENTS

| | | |
|---|---|---|
| CN | 101546233 A | 9/2009 |
| CN | 101714057 A | 5/2010 |
| CN | 101916166 A | 12/2010 |
| CN | 102016777 A | 4/2011 |
| CN | 102064855 A | 5/2011 |
| CN | 102084325 A | 6/2011 |
| CN | 102223609 A | 10/2011 |
| CN | 102271179 A | 12/2011 |
| WO | WO 2007/067693 A2 | 6/2007 |
| WO | WO 2011/143470 A1 | 11/2011 |

OTHER PUBLICATIONS

Partial translation of Office Action dated May 27, 2013 in connection with Chinese Patent Application No. 201210047867.3.

\* cited by examiner

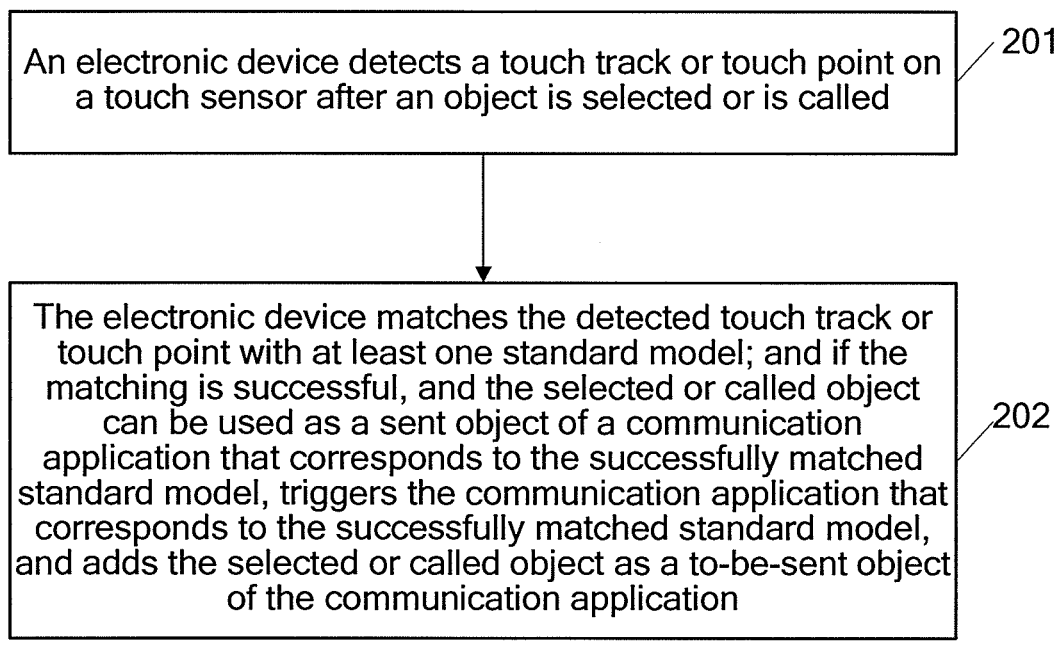
FIG. 2-a

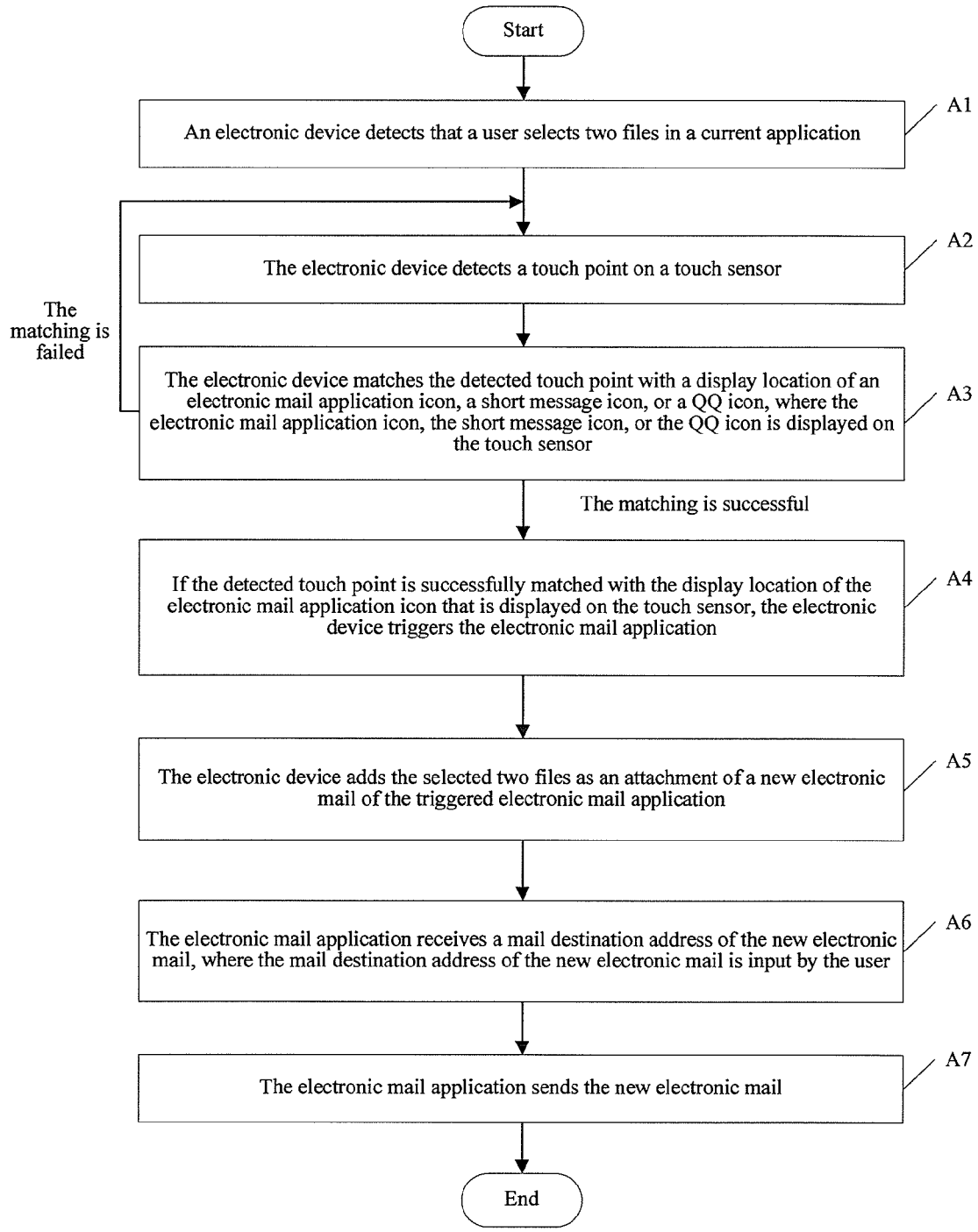
FIG. 2-b

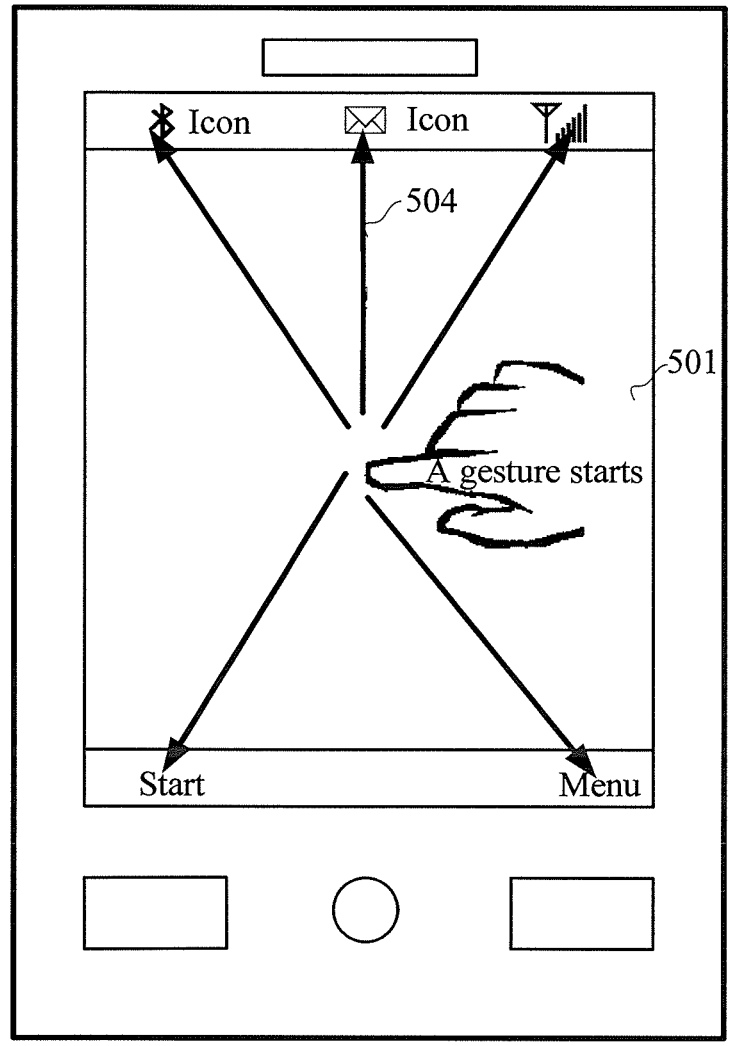
FIG. 5-a

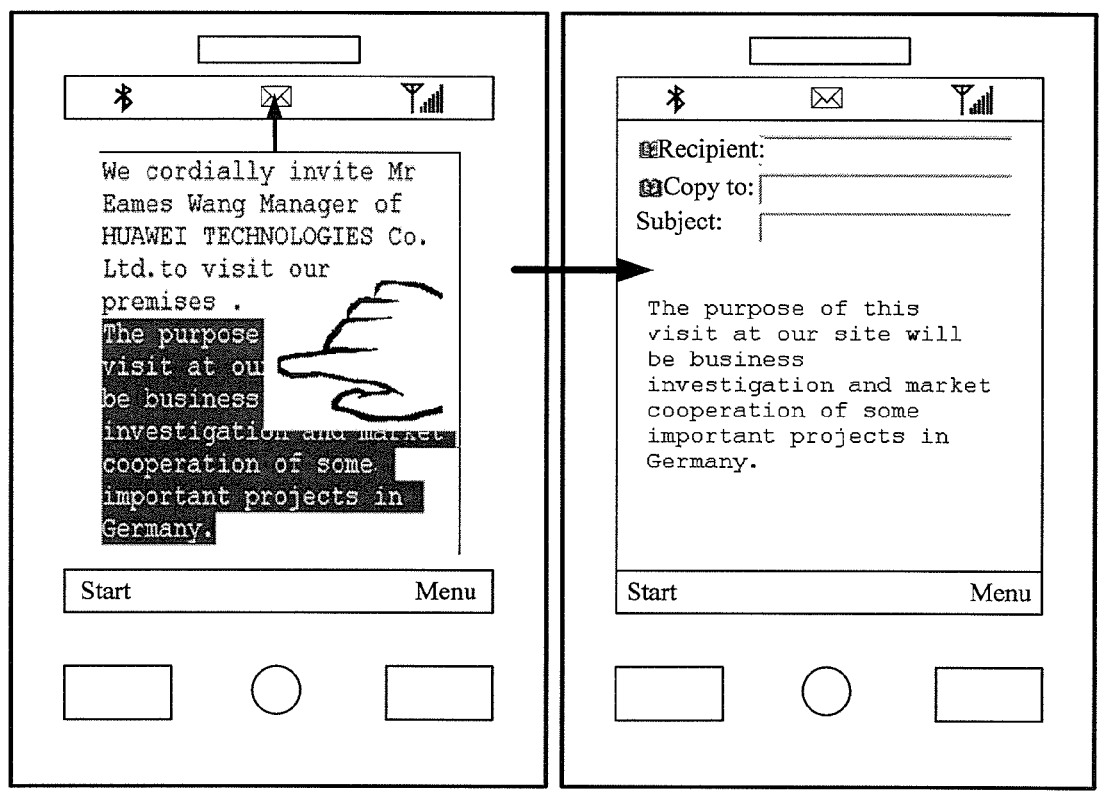
FIG. 5-b

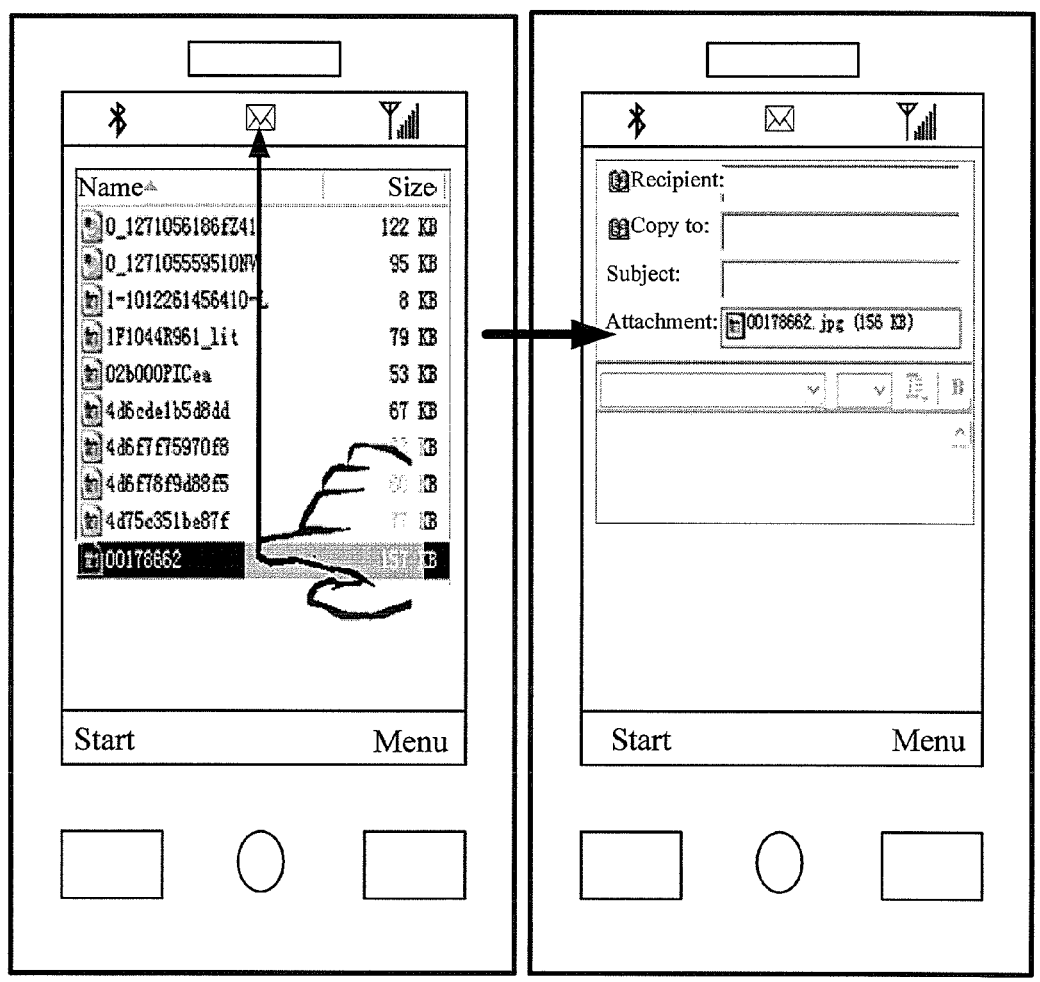
FIG. 5-c

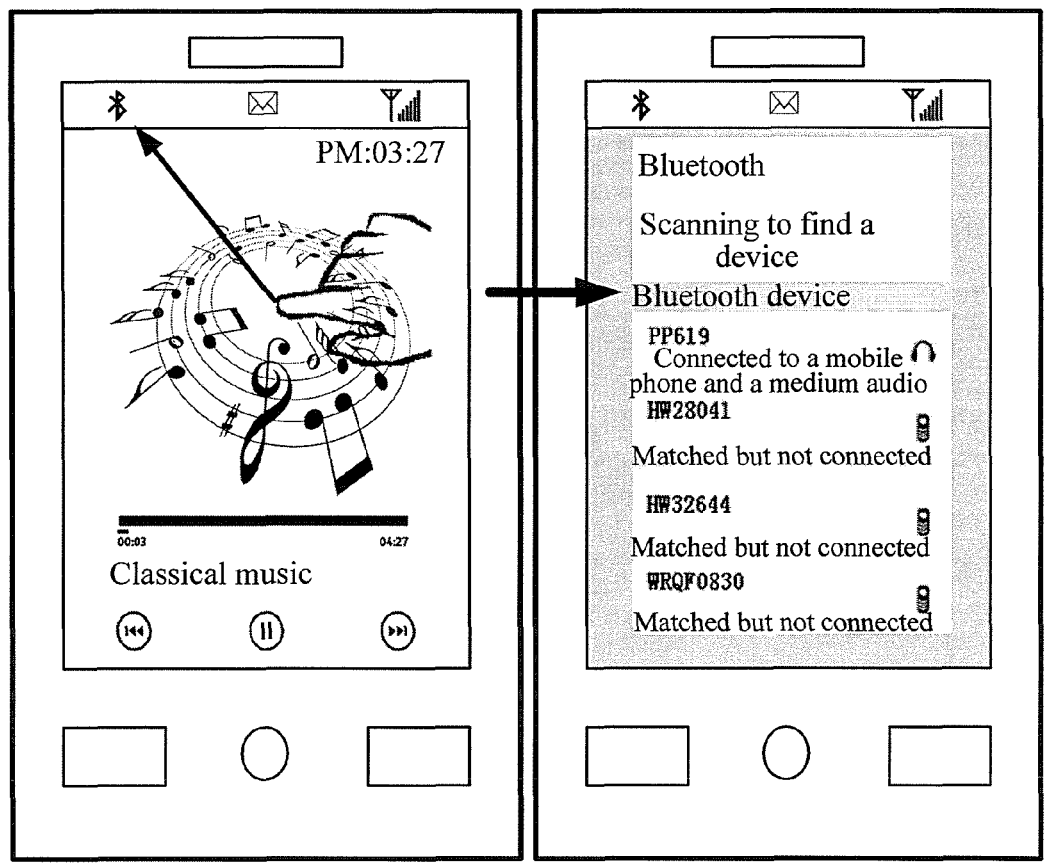
FIG. 5-d

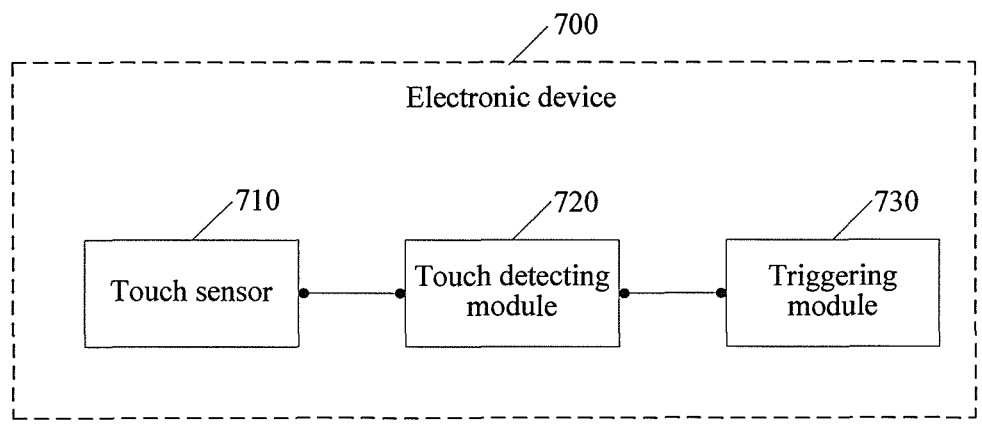
FIG. 7-a
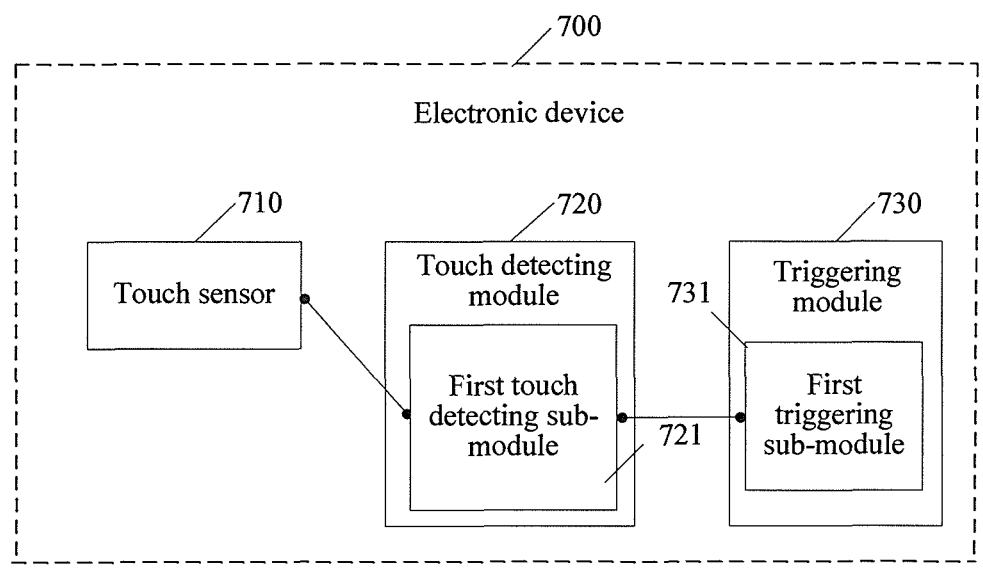
FIG. 7-b

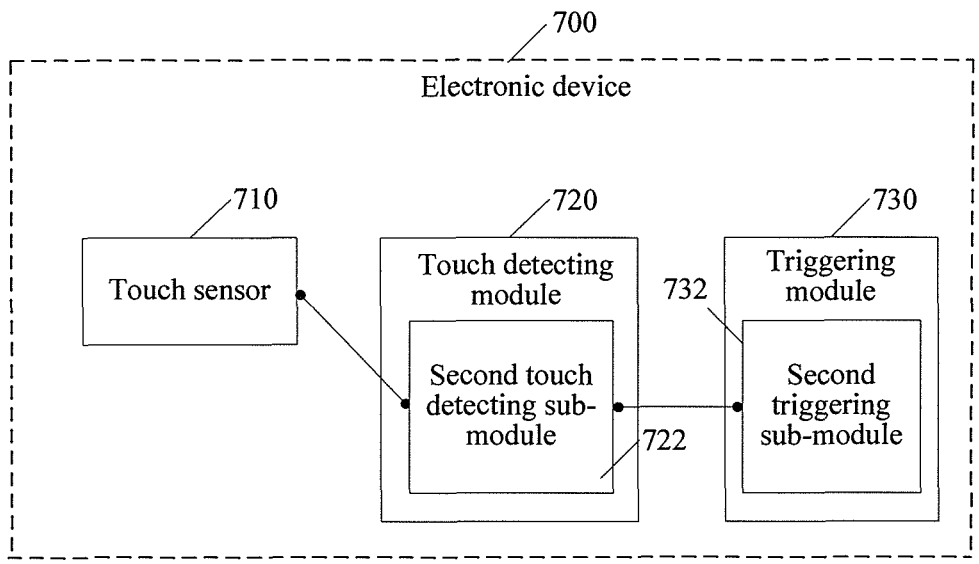
FIG. 7-c
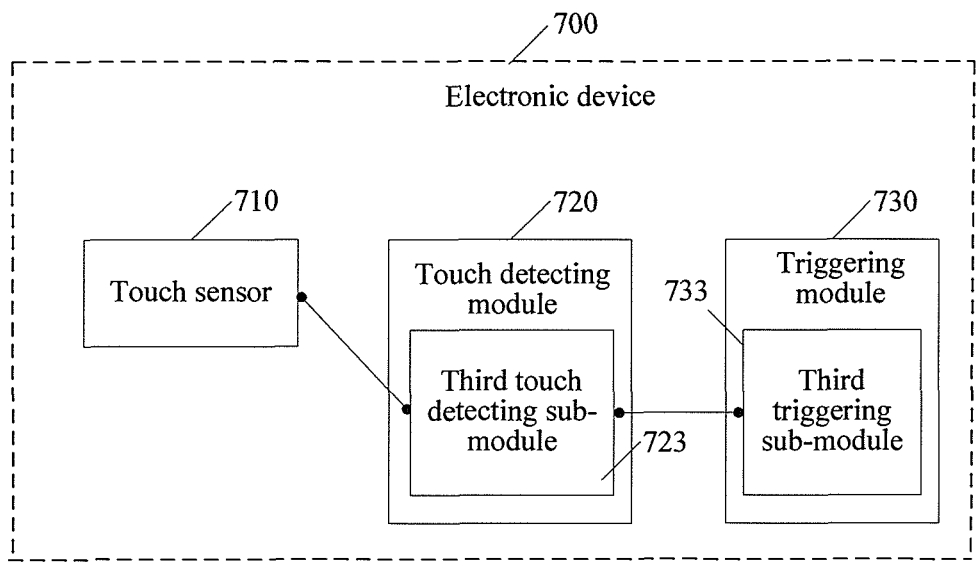
FIG. 7-d

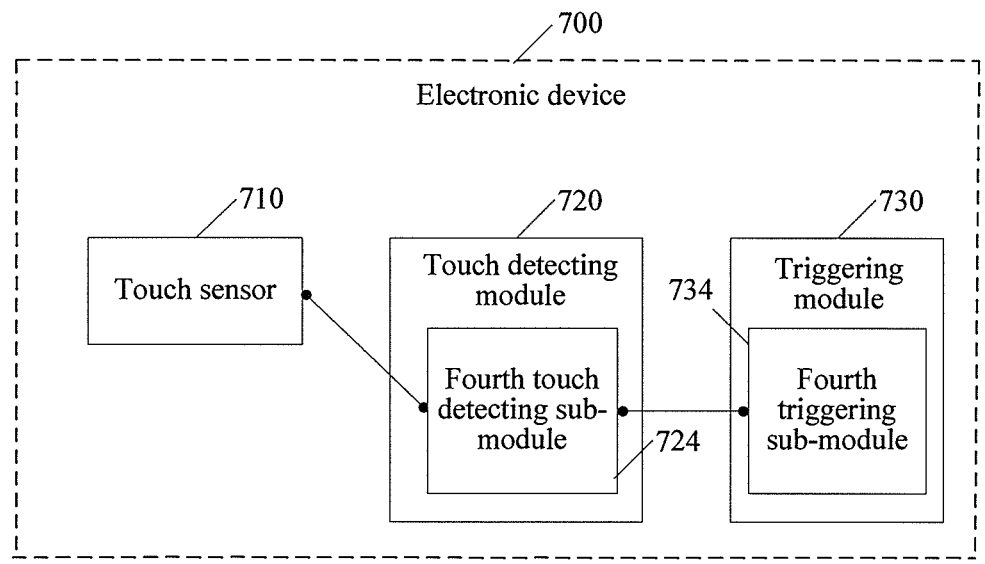
FIG. 7-e
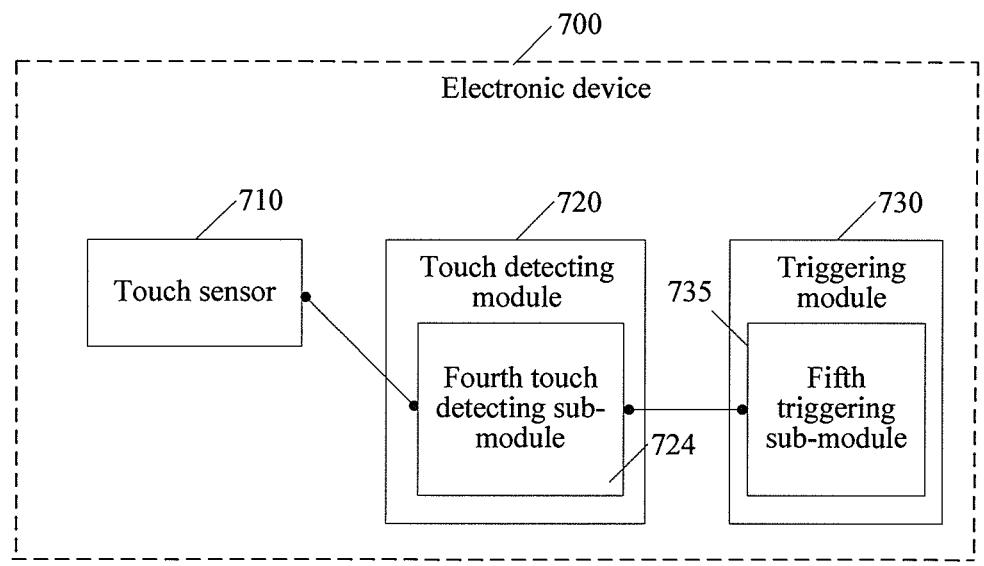
FIG. 7-f

COMMUNICATION APPLICATION TRIGGERING METHOD AND ELECTRONIC DEVICE

CROSS-REFERENCE TO RELATED APPLICATIONS

This application is a continuation of International Application No. PCT/CN2012/075923, filed on May 23, 2012, which claims priority to Chinese Patent Application No. 201210047867.3, filed on Feb. 28, 2012, both of which are hereby incorporated by reference in their entireties.

TECHNICAL FIELD

The present invention relates to the field of electronic technologies, and in particular, to a communication application triggering method and an electronic device.

BACKGROUND

For example, many electronic products such as a mobile phone are configured with a touch screen currently.

For triggering of a communication function of an existing electronic product that has a touch screen such as a mobile phone, communication applications such as short message sending, multimedia message sending, bluetooth transmission, and Email are generally triggered by using a menu manner. As shown in FIG. 1, after a user selects an object (such as a picture or a text), the user uses an option in a context menu or button menu to select a communication type (such as a short message, bluetooth, or Email) that is required to be triggered, then triggers a corresponding communication application according to menu selection, and subsequently adds a selected object as a to-be-sent object of the communication application and performs a sending operation on the object.

In the prior art, at least more than two selecting actions are required before a communication application can be triggered.

SUMMARY

Embodiments of the present invention provide a communication application triggering method and an electronic device, so as to simplify a communication application triggering mechanism, and improve user experience.

In order to solve the foregoing technical problems, the embodiments of the present invention provide the following technical solutions.

A communication application triggering method is applied to an electronic device that has a touch sensor, where the method includes:

detecting a touch track or touch point on the touch sensor after an object is selected or is called; and matching the detected touch track or touch point with at least one standard model; and if the matching is successful, and the object can be used as a sent object of a communication application that corresponds to the successfully matched standard model, triggering the communication application that corresponds to the successfully matched standard model, and adding the object as a to-be-sent object of the communication application, where different communication applications correspond to different standard models.

An electronic device includes:

a touch sensor;

a touch detecting module, configured to detect a touch track or touch point on the touch sensor after an object is selected or is called; and a triggering module, configured to match the touch track or touch point with at least one standard model, where the touch track or touch point is detected by the touch detecting module; and if the matching is successful, and the object can be used as a sent object of a communication application that corresponds to the successfully matched standard model, trigger the communication application that corresponds to the successfully matched standard model, and add the object as a to-be-sent object of the communication application, where different communication applications correspond to different standard models.

It can be seen from the foregoing that, in the embodiments of the present invention, a electronic device that has a touch sensor detects a touch track or touch point on the touch sensor after an object is selected or is called; and matches the detected touch track or touch point with at least one standard model; and if the matching is successful, and the selected or called object can be used as a sent object of a communication application that corresponds to the successfully matched standard model, triggers the communication application that corresponds to the successfully matched standard model, and adds the selected or called object as a to-be-sent object of the communication application, where different communication applications correspond to different standard models. With the solutions, the communication application triggering mechanism is simplified, the electronic device may trigger a corresponding communication application as long as a user performs one operation, and the selected or called object may be automatically added as a to-be-sent object of the communication application, and therefore, the user experience may be improved.

BRIEF DESCRIPTION OF THE DRAWINGS

To describe the technical solutions in the embodiments of the present invention or the prior art more clearly, the accompanying drawings used in the description of the embodiments or the prior art are briefly introduced in the following. Evidently, the accompanying drawings are only some embodiments of the present invention, and persons of ordinary skill in the art may also obtain other drawings according to these accompanying drawings without creative efforts.

FIG. 2-*a* is a schematic flowchart of a communication application triggering method according to an embodiment of the present invention;

FIG. 2-*b* is a schematic flowchart of another communication application triggering method according to an embodiment of the present invention;

FIG. 5-*a* is a schematic diagram of a standard touch point model according to an embodiment of the present invention;

FIG. 5-*b* is a schematic diagram of communication application triggering according to an embodiment of the present invention;

FIG. 5-c is a schematic diagram of another communication application triggering according to an embodiment of the present invention;

FIG. 5-d is a schematic diagram of another communication application triggering according to an embodiment of the present invention;

FIG. 7-a is a schematic diagram of an electronic device according to an embodiment of the present invention;

FIG. 7-b is a schematic diagram of another electronic device according to an embodiment of the present invention;

FIG. 7-c is a schematic diagram of another electronic device according to an embodiment of the present invention;

FIG. 7-d is a schematic diagram of another electronic device according to an embodiment of the present invention;

FIG. 7-e is a schematic diagram of another electronic device according to an embodiment of the present invention; and FIG. 7-f is a schematic diagram of another electronic device according to an embodiment of the present invention.

DETAILED DESCRIPTION

Figure 1:
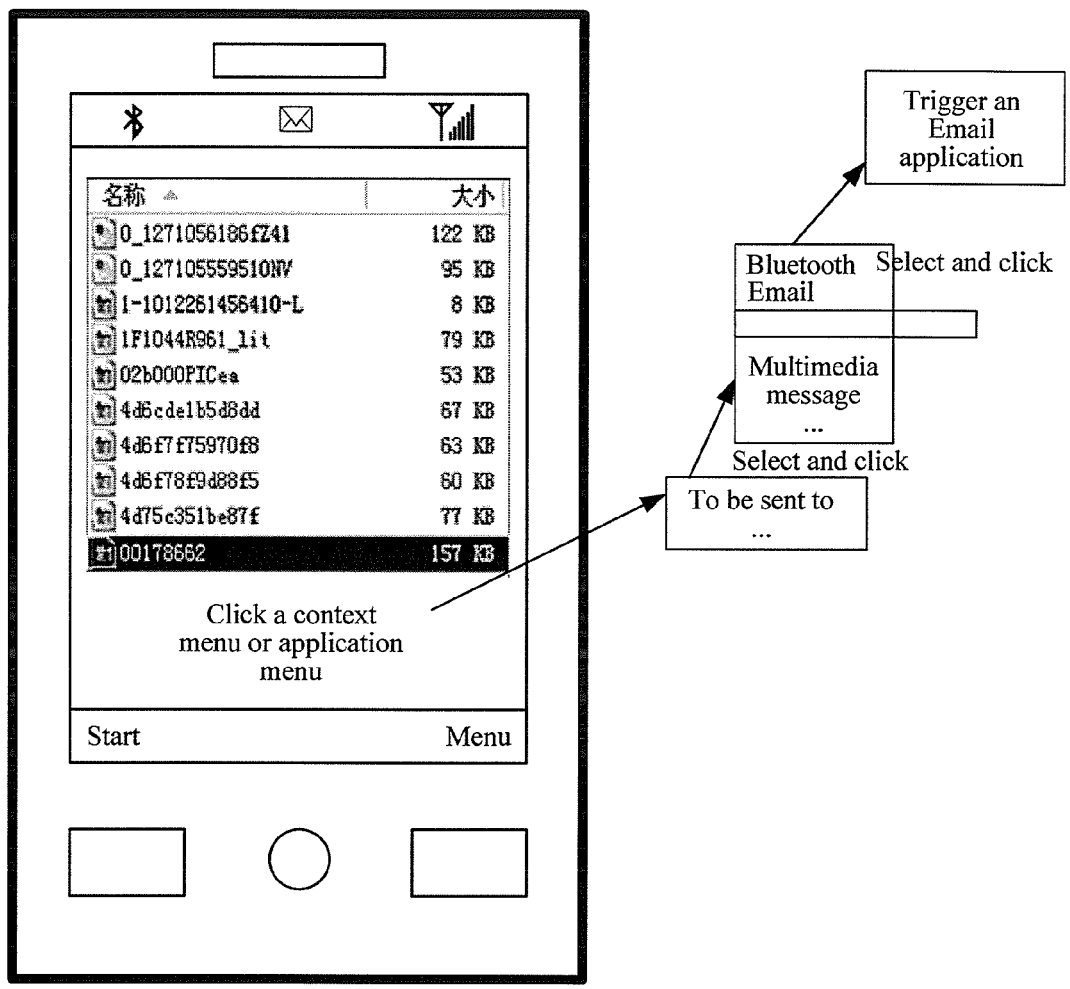
FIG. 1 is a schematic diagram of communication application triggering according to the prior art.

Embodiments of the present invention provide a communication application triggering method and an electronic device, so as to simplify a communication application triggering mechanism, and improve user experience.

In order to make the objectives, features, and advantages of the present invention clearer and more comprehensible, the technical solutions in the embodiments of the present invention are clearly and completely described in the following with reference to the accompanying drawings in the embodiments of the present invention. Evidently, the embodiments in the following description are only a part rather than all of the embodiments of the present invention. Based on the embodiments of the present invention, all other embodiments obtained by persons of ordinary skill in the art without creative effects shall fall within the protection scope of the present invention.

Detailed illustration is made separately in the following.

An embodiment of the present invention provides a communication application triggering method, the communication application triggering method is applied to an electronic device that has a touch sensor, and the method may include: detecting a touch track or touch point on the touch sensor after an object is selected or is called; and matching the detected touch track or touch point with at least one standard model; and if the matching is successful, and the selected or called object can be used as a sent object of a communication application that corresponds to the successfully matched standard model, triggering the communication application that corresponds to the successfully matched standard model, and adding the selected or called object as a to-be-sent object of the communication application, where different communication applications correspond to different standard models.

Referring to FIG. 2, steps of a communication application triggering method provided in an embodiment of the present invention may include:

201: An electronic device detects a touch track or touch point on a touch sensor after an object is selected or is called.

The electronic device mentioned in this embodiment of the present invention, for example, may be an electronic device that has a touch sensor, such as a mobile phone, a portable computer, or a personal digital assistant. The touch sensor, for example, may include devices that can sense a touch, such as a touch screen, a location sensor, and a touch sensing button.

202: The electronic device matches the detected touch track or touch point with at least one standard model; and if the matching is successful, and the selected or called object can be used as a sent object of a communication application that corresponds to the successfully matched standard model, triggers the communication application that corresponds to the successfully matched standard model, and adds the selected or called object as a to-be-sent object of the communication application.

Different communication applications correspond to different standard models.

In an embodiment of the present invention, in an operating system or current application, an electronic device may detect a touch track or touch point on a touch sensor after an object is selected or is called by the current application (for example, the current application is an audio and video playing application, and the audio and video playing application calls a certain audio and video file for playing); and in addition, if in the operating system or current application, no object is selected or no object is called by the current application, the electronic device may also match the detected touch track or touch point with at least one standard model, and if the matching is successful, may trigger a communication application that corresponds to the successfully matched standard model.

The communication application mentioned in this embodiment of the present invention may refer to an application through which one electronic device and another device communicate, or may also refer to an application through which different modules or components in the same electronic device communicate (for example, a communication application between a memory and a non-volatile storage medium of an electronic device). The communication application, for example, may include at least one of the following applications: a short message application, a multimedia message application, an electronic mail application, a real-time communication application (such as QQ or MSN), a social application (such as a micro-blog application), an infrared application, a bluetooth application, a wifi application, and an application of storage in a storage device (where, the application of storage in a storage device, for example, may refer to an application that an electronic device stores, in its non-volatile storage medium, data that is in its memory).

The selected or called object mentioned in this embodiment of the present invention includes at least one of the following: a file (such as a video file or an audio file), a file folder, a file clip (such as a partial area of a picture, or a partial excerpt clip of an audio and video file), and a character clip.

It can be seen from the foregoing that, in this embodiment, a touch track or touch point on a touch sensor is detected after an object is selected or is called; and the detected touch track or touch point is matched with at least one standard model; and if the matching is successful, and the selected or called object can be used as a sent object of a communication application that corresponds to the successfully matched standard model, the communication application that corresponds to the successfully matched standard model is triggered, and the selected or called object is added as a to-be-sent object of the communication application. Different communication applications correspond to different standard models. With this solution, the communication application triggering mechanism is simplified, the electronic device may trigger a corresponding communication application as long as a user performs one operation, and the selected or called object is added as a to-be-sent object of the communication application, and therefore, the user experience may be improved.

In an embodiment of the present invention, a standard model, for example, includes a standard touch point model. Each standard touch point model, for example, includes at least one standard touch point. For example, if a distance between at least one detected touch point (for example, including a touch starting point, a touch ending point and/or another touch point) and at least one standard touch point in a certain standard touch point model is less than a threshold (where, the threshold may be specifically set according to a specific scenario, for example, the threshold is less than 3 millimeters or another value), it may be considered that the at least one detected touch point is successfully matched with the standard touch point model; otherwise, it may be considered that the matching is failed.

For example, an electronic device may detect a touch ending point on a touch sensor after an object is selected or is called; and match the detected touch ending point with at least one standard touch point model of a first type; and if the matching is successful, and the selected or called object can be used as a sent object of a communication application that corresponds to the successfully matched touch point model of the first type, trigger the communication application that corresponds to the successfully matched touch point model of the first type, and add the selected or called object as a to-be-sent object of the communication application, where different communication applications correspond to different standard touch point models of the first type.

For another example, an electronic device may detect a touch starting point and a touch ending point on a touch sensor after an object is selected or is called; and match the detected touch starting point and touch ending point with at least one standard touch point model of a second type; and if the matching is successful, and the selected or called object can be used as a sent object of a communication application that corresponds to the successfully matched standard touch point model of the second type, trigger the communication application that corresponds to the successfully matched touch point model, and add the selected or called object as a to-be-sent object of the communication application, where different communication applications correspond to different standard touch point models of the second type.

For another example, an electronic device may detect a touch point on a touch sensor after an object is selected or is called; and match at least one detected touch point with at least one standard touch point model of a third type; and if the matching is successful, and the selected or called object can be used as a sent object of a communication application that corresponds to the successfully matched standard touch point model of the third type, trigger the communication application that corresponds to the successfully matched touch point model of the third type, and add the selected or called object as a to-be-sent object of the communication application, where different communication applications correspond to different standard touch point models of the third type.

In an application scenario, an electronic device, for example, may match a detected touch ending point with a display location (here, the display location of a communication application icon is regarded as one standard touch point in a standard touch point model) of at least one communication application icon (such as an electronic mail application icon, a real-time communication application icon, or a bluetooth application icon) that is displayed on a touch sensor; and if a distance between the touch ending point and a display location of one of communication application icons that are displayed on the touch sensor is less than a first threshold, determine that the touch ending point is successfully matched with the display location of the application icon, where the distance between the touch ending point and the display location of the application icon is less than the first threshold, and if the selected or called object can be used as a sent object of a communication application that corresponds to the communication application icon that is at the successfully matched display location, trigger the communication application that corresponds to the communication application icon, and add the selected or called object as a to-be-sent object of the communication application.

In another application scenario, an electronic device, for example, may match at least one detected touch point (which may include a touch starting point, a touch ending point, and another touch point) with a display location (here, the display location of a communication application icon is regarded as one standard touch point in a standard touch point model) of at least one communication application icon (such as an electronic mail application icon, a real-time communication application icon, or a bluetooth application icon) that is displayed on a touch sensor; and if a distance between one or multiple of the at least one detected touch point and a display location of one of communication application icons that are displayed on the touch sensor is less than a second threshold, determine that the at least one detected touch point is successfully matched with the display location of the communication application icon, where the distance between the at least one detected touch point and the display location of the communication application icon is less than the second threshold, and if the selected or called object can be used as a sent object of a communication application that corresponds to the communication application icon that is at the successfully matched display location, trigger the communication application that corresponds to the communication application icon, and add the selected or called object as a to-be-sent object of the communication application.

In another embodiment of the present invention, a standard model, for example, includes a standard touch track model. Each standard touch track model, for example, may include at least one standard touch direction. For example, if a deviation between a touch direction that is determined according to a detected touch track and one of standard touch directions included in a certain standard touch track model is less than a threshold (where, the threshold may be specifically set according to a specific scenario, for example, the threshold is less than 5° or another value), it may be considered that the touch direction that is determined according to the detected touch track is successfully matched with the standard touch track model (that is to say, the detected touch track is successfully matched with the standard touch track model); otherwise, it may be considered that the matching is failed. Alternatively, each standard touch track model, for example, may include at least one standard touch figure (such as a triangle, a quadrangle, a circle, or another figure). For example, if the similarity between a touch figure that is determined according to the detected touch track and one of standard touch figures included in a certain standard touch track model is greater than a threshold (the threshold may be set according to a specific scenario, for example, the threshold is greater than 90% or another value), it may be considered that the touch figure that is determined according to the detected touch track is successfully matched with the standard touch track model (that is to say, the detected touch track is successfully matched with the standard touch track model); otherwise, it may be considered that the matching is failed. It should be noted that, the so-called similarity between two figures in this embodiment of the present invention may refer to the similarity between shapes of two figures, or may also consider the similarity between shapes and sizes of two figures simultaneously. If two figures are both vector figures, the similarity between the two figures in one or multiple of reference quantities such as shapes, sizes, and vector lines that form the figures may be considered simultaneously.

For example, an electronic device may detect a touch track on a touch sensor after an object is selected or is called, determine a touch direction that corresponds to the detected touch track, and match the determined touch direction with at least one standard touch track model of a first type; if a deviation between the determined touch direction, and one of standard touch directions included in one of the at least one standard touch track model of the first type is less than a third threshold, may determine that the detected touch track is successfully matched with the at least one standard touch track model of the first type, and if the selected or called object can be used as a sent object of a communication application that corresponds to the successfully matched standard touch track model of the first type, trigger the communication application that corresponds to the successfully matched standard touch track model of the first type, and add the selected or called object as a to-be-sent object of the communication application, where different communication applications may correspond to different standard touch track models of the first type.

For another example, an electronic device may detect a touch track on a touch sensor after an object is selected or is called, determine a touch figure that corresponds to the detected touch track, and match the determined touch figure with at least one standard touch track model of a second type; and if the similarity between the determined touch figure and one of standard touch figures included in one of the at least one standard touch track model of the second type is greater than a threshold, may determine that the detected touch track is successfully matched with the at least one standard touch track model of the second type, and if the selected or called object can be used as a sent object of a communication application that corresponds to the successfully matched standard touch track model of the second type, trigger the communication application that corresponds to the successfully matched standard touch track model of the second type, and add the selected or called object as a to-be-sent object of the communication application, where different communication applications may correspond to different standard touch track models of the second type.

It can be understood that, the foregoing exemplified matching manner is only exemplary, and definitely, a touch track or touch point may also be matched based on other matching manners, which are not exemplified one by one herein.

To better understand and implement the foregoing solution in this embodiment of the present invention, several specific application scenarios are exemplified in the following for illustration.

For example, a current application is a file browser; if an electronic device detects that a user selects two files (a selected object is two files) in the current application, the electronic device detects a touch track or touch point, and matches the detected touch track or touch point with at least one standard model; it is assumed that the detected touch track or touch point is successfully matched with a standard model that corresponds to an electronic mail application, the electronic device triggers the electronic mail application, and may add the selected two files as an attachment of a new electronic mail of the electronic mail application, and sends the electronic mail after the user inputs a mail destination address; and if a file selected by the user in the current application is a picture file, and an electronic mail application can use the picture file as content of an edition area, the selected picture file may also be added as the content of the edition area of the electronic mail application (a modification operation such as scrawling, zoom-in, zoom-out, or cutting may further be performed on the picture file that is added to the edition area). A manner in which the electronic device triggers and operates another communication application which may be added with an attachment or can send a file is similar to this.

In addition, if the electronic device successfully matches the detected touch track or touch point with a standard model that corresponds to a short message application, and it is assumed that the short message application cannot use a file as a sent object, the electronic device may not trigger the short message application, or the electronic device may trigger the short message application, but does not execute an operation of adding the selected two files as an attachment of the short message application or content of the edition area.

A procedure in a specific application scenario is taken as an example in the following for illustration.

Referring to FIG. 2-b, another communication application triggering method may include:

A1: An electronic device detects that a user selects two files in a current application.

A2: The electronic device detects a touch point on a touch sensor.

A3: The electronic device matches the detected touch point with a display location of an electronic mail application icon, a short message icon, or a QQ icon, where the electronic mail application icon, the short message icon, or the QQ icon is displayed on the touch sensor.

A4: If the detected touch point is successfully matched with the display location of the electronic mail application icon that is displayed on the touch sensor, the electronic device triggers the electronic mail application.

In addition, if the detected touch point is not successfully matched with a display location of any communication application icon that is displayed on the touch sensor (that is, the matching is failed), the electronic device may ignore the detected touch point, and the procedure returns to step A2.

A5: The electronic device adds the selected two files as an attachment of a new electronic mail of the triggered electronic mail application.

A6: The electronic mail application receives a mail destination address of the new electronic mail, where the mail destination address of the new electronic mail is input by the user.

A7: The electronic mail application sends the new electronic mail.

For another example, a current application is a document edition application; if an electronic device detects that a user selects a section of edited characters in the current application, the electronic device detects a touch track or touch point, and matches the detected touch track or touch point with at least one standard model; and it is assumed that the detected touch track or touch point is successfully matched with a standard model that corresponds to an electronic mail application, the electronic device triggers the electronic mail application, and adds the section of selected characters as to-be-sent content of a newly established electronic mail of the electronic mail application, and may send the corresponding electronic mail after a user inputs a mail destination address. A manner in which the electronic device triggers and operates another communication application which may use characters as sent content is similar to this.

For another example, a current application is a picture edition application (such as Photoshop); if an electronic device detects that a user selects a partial area of a certain picture in the current application, where the certain picture is being edited, the electronic device detects a touch track or touch point, and matches the detected touch track or touch point with at least one standard model; and it is assumed that the detected touch track or touch point is successfully matched with a standard model that corresponds to an electronic mail application, the electronic device triggers the electronic mail application, and may add the selected picture area as content of an edition area of a newly established electronic mail of the electronic mail application, and sends the corresponding electronic mail after the user inputs a mail destination address. A manner in which the electronic device triggers and operates another communication application which may use characters as sent content is similar to this.

For another example, a current application is an audio playing application (or video playing application), a user selects no object, but the audio playing application (or video playing application) currently calls an audio file (or video file); an electronic device detects a touch track or touch point, and matches the detected touch track or touch point with at least one standard model; and it is assumed that the detected touch track or touch point is successfully matched with a standard model that corresponds to a bluetooth application, the electronic device triggers the bluetooth application, and adds the called audio file (or video file) as a to-be-sent object of the bluetooth application. For example, if a destination device of the bluetooth application is a bluetooth headset or another power amplification device that supports bluetooth, the bluetooth application sends the audio file (or video file) through bluetooth to the destination device for playing.

In addition, it is assumed that a current application is an audio playing application (or video playing application), a user selects no object, and the audio playing application (or video playing application) currently does not call any audio file (or video file); an electronic device may also match a detected touch track or touch point with at least one standard model; and it is assumed that the detected touch track or touch point is successfully matched with a standard model that corresponds to a bluetooth application, the electronic device triggers the bluetooth application. For example, if a destination device of the bluetooth application is a bluetooth headset or another power amplification device that supports bluetooth, the electronic device may further trigger the bluetooth application, so as to establish a bluetooth connection with the destination device, and other application scenarios is deduced by analogy.

Illustration is made through several application examples in the following.

Application Example 1

Figure 3:
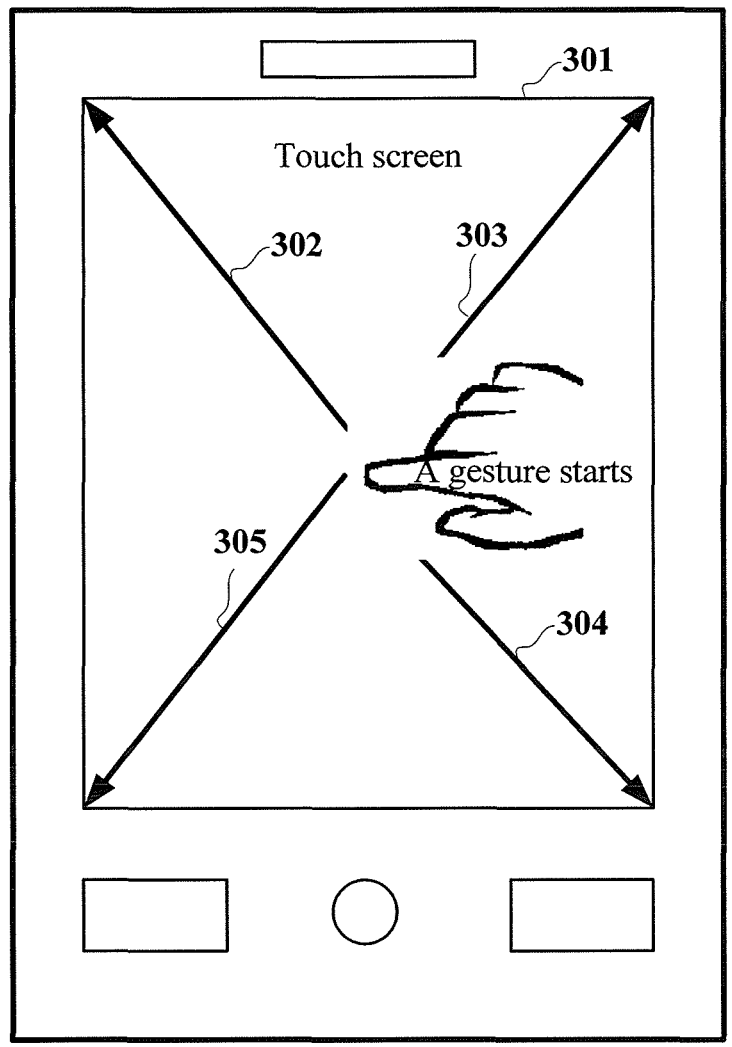
FIG. 3 is a schematic diagram of a standard touch track model according to an embodiment of the present invention.

Referring to FIG. 3, on an electronic device that has a touch screen 301, if a touch track is detected in a current application, a touch direction of the detected touch track is determined, for example, a touch track with a direction between 30 degrees and 60 degrees corresponds to a standard touch track model 302, and other cases are similar. Different communication applications are determined to be triggered according to a touch direction of the detected touch track. As shown in FIG. 3, the standard touch track model 302 triggers an Email application correspondingly; a standard touch track model 303 triggers an SMS multimedia message application correspondingly; a standard touch track model 304 triggers a bluetooth communication application correspondingly; and a standard touch track model 305 triggers a wifi application. Starting points of the standard touch track models shown in FIG. 3 are all located on the touch screen 301. When the detected touch track is successfully matched with one of the standard touch track models 302 to 305, a corresponding communication application may be triggered.

Application Example 2

Figure 4:
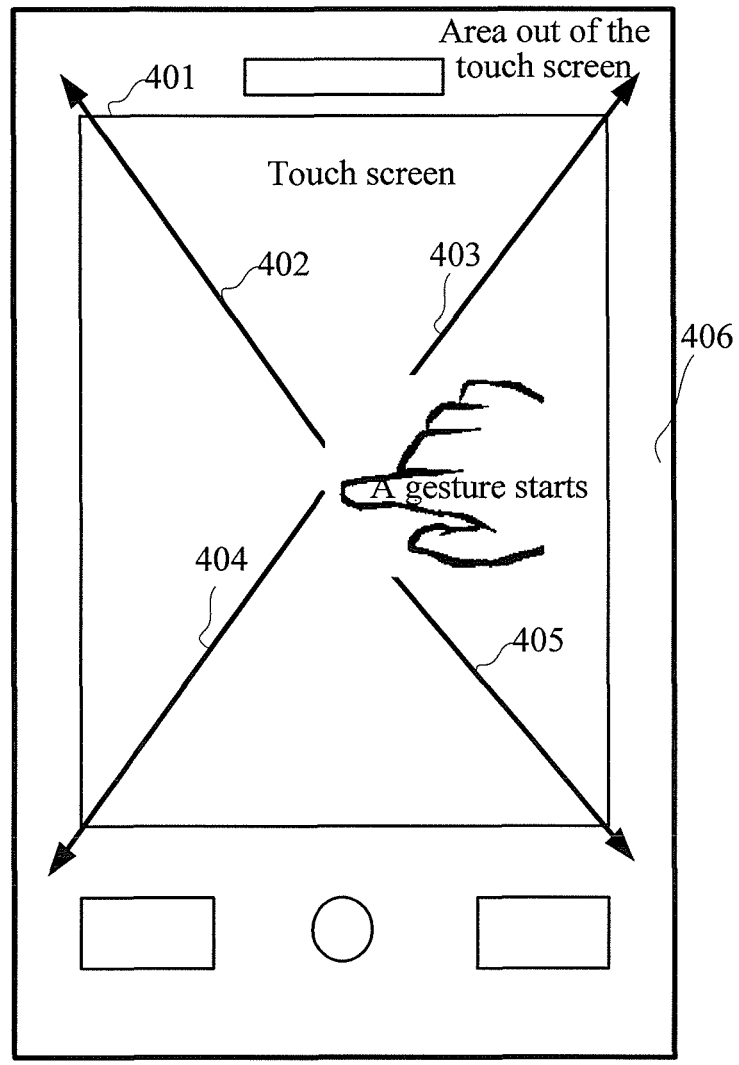
FIG. 4 is a schematic diagram of another standard touch track model according to an embodiment of the present invention.

Referring to FIG. 4, on an electronic device that has a touch screen 401, an implementation manner of the application example 2 is similar to that of the application example 1. When a detected touch track is successfully matched with one of standard touch track models 402 to 405, a corresponding communication application may be triggered. A difference lies in that, an ending point of its standard touch track model is in an area 406 out of the touch screen 401.

Application Example 3

Referring to FIG. 5-a, for example, on an electronic device that has a touch screen 501, if a distance between a touch ending point (such as a touch dragging release location) detected in a current application and a display location of a certain communication application icon on the touch screen 501 (the display location may be regarded as a standard touch point in a standard touch point model) is less than a threshold, it is determined that the detected touch ending point is successfully matched with the display location of the certain communication application icon. For example, if the detected touch ending point is located on an Email application icon (which corresponds to a standard touch point model 504), an Email application may be triggered, and the rest is deduced by analogy.

Referring to FIG. 5-b, an electronic device detects that a user selects a section of characters, and detects that a touch ending point is an Email application icon, and therefore, the electronic device triggers an Email application, and adds the selected section of characters as content of an edition area of an Email that is newly established by the Email application.

Referring to FIG. 5-c, an electronic device detects that a user selects a picture file, and detects that a touch ending point is an Email application icon, and therefore, the electronic device triggers an Email application, and adds the selected picture file as an attachment of an Email that is newly established by the Email application. Definitely, if the Email application supports that a picture is used as content of an edition area, the electronic device may also add the selected picture file as content of an edition area of an Email that is newly established by the Email application.

Referring to FIG. 5-d, a current application is an audio playing application, the audio playing application currently calls an audio file for playing, and an electronic device detects that a touch ending point is a bluetooth application icon, and therefore, the electronic device triggers a bluetooth application, and adds the called audio file as a to-be-sent object of the bluetooth application.

Application Example 4

Figure 6:
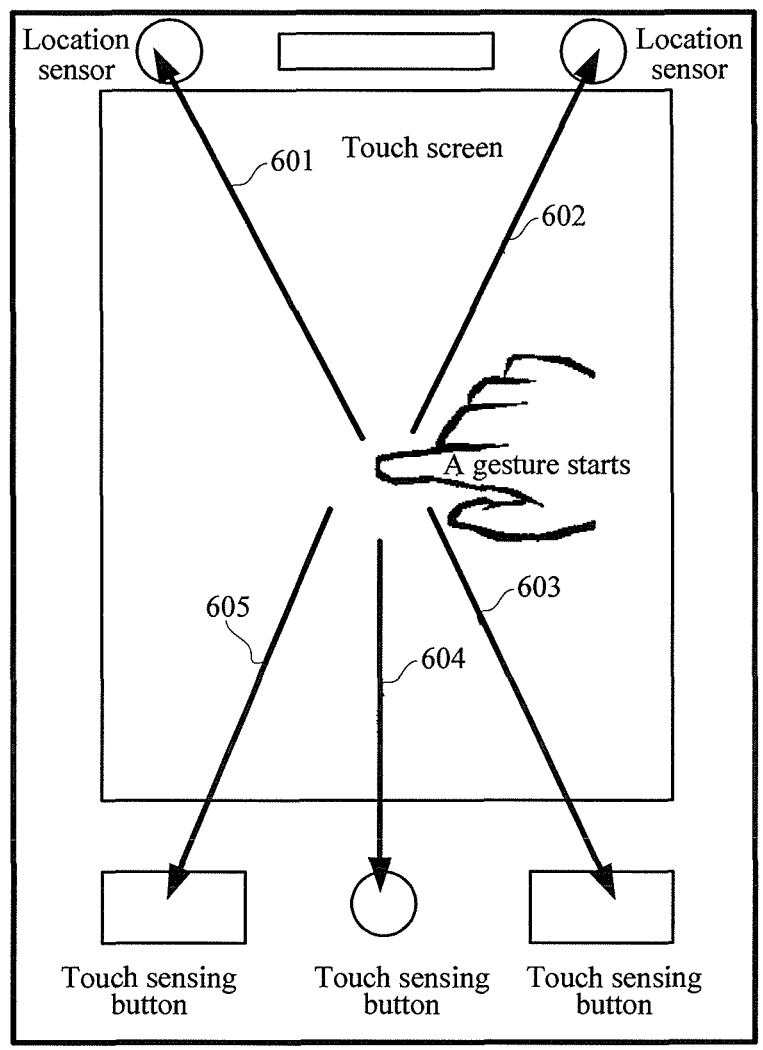
FIG. 6 is a schematic diagram of another standard touch point model according to an embodiment of the present invention.

Referring to FIG. 6, for example, on an electronic device that has a touch sensor, if a distance between a touch ending point (such as touch dragging release locations 601 to 605) detected in a current application and a location of a certain location sensor or touch sensing button on an electronic device (the location of the location sensor or touch sensing button may be regarded as a standard touch point in a standard touch point model) is less than a threshold, the electronic device determines that the detected touch ending point is successfully matched with the location of the certain location sensor or touch sensing button. For example, if the touch ending point detected by the electronic device is located on a location of a certain location sensor, the electronic device may trigger a communication application that corresponds to the location sensor, and the rest is deduced by analogy.

It can be understood that, a matching manner exemplified in the foregoing application example 4 is only exemplary, and definitely, a touch track or touch point may also be matched based on other matching manners, which are not exemplified one by one herein.

It should be noted that, for brevity, the foregoing method embodiments are described as a series of actions. However, persons skilled in the art should know that the present invention is not limited to the order of the described actions, because according to the present invention, some steps may be performed in other order or simultaneously. It should also be known to persons skilled in the art that the described embodiments in the specification are all exemplary embodiments, and the involved actions and modules are not necessarily required in the present invention.

Referring to FIG. 7-a, an embodiment of the present invention provides an electronic device 700, which may include:

a touch sensor 710, where the touch sensor 710, for example, may include, but is not limited to, devices that can sense a touch, such as a touch screen, a location sensor, and a touch sensing button;

a touch detecting module 720, configured to detect a touch track or touch point on the touch sensor 710 after an object is selected or is called; and a triggering module 730, configured to match the touch track or touch point with at least one standard model, where the touch track or touch point is detected by the touch detecting module 720; and if the matching is successful, and the selected or called object can be used as a sent object of a communication application that corresponds to the successfully matched standard model, trigger the communication application that corresponds to the successfully matched standard model, and add the selected or called object as a to-be-sent object of the communication application, where different communication applications correspond to different standard models.

The electronic device 700 in this embodiment, for example, may be an electronic device that has a touch sensor, such as a mobile phone, a portable computer, or a personal digital assistant.

In an embodiment of the present invention, in an operating system or current application, the touch detecting module 720 may detect a touch track or touch point on the touch sensor 710 after an object is selected or is called by the current application (for example, the current application is an audio and video playing application, and the audio and video playing application calls a certain audio and video file for playing); and in addition, if in the operating system or current application, no object is selected or no object is called by the current application, the triggering module 730 may also match the touch track or touch point with at least one standard model, where the touch track or touch point is detected by the touch detecting module 720, and if the matching is successful, may trigger a communication application that corresponds to the successfully matched standard model.

The communication application mentioned in this embodiment of the present invention includes at least one of the following applications: a short message application, a multimedia message application, an electronic mail application, a real-time communication application (such as QQ or MSN), a social application (such as a micro-blog application), an infrared application, a bluetooth application, a wifi application, and an application of storage in a storage device.

The selected or called object mentioned in this embodiment of the present invention includes at least one of the following: a file (such as a video file or an audio file), a file folder, a file clip (such as a partial area of a picture, or a partial excerpt clip of an audio and video file), and a character clip.

In an embodiment of the present invention, a standard model, for example, includes a standard touch point model. Each standard touch point model, for example, includes at least one standard touch point. For example, if a distance between at least one detected touch point (for example, including a touch starting point, a touch ending point and/or another touch point) and at least one standard touch point in a certain standard touch point model is less than a threshold (where, the threshold may be specifically set according to a specific scenario, for example the threshold is less than 3 millimeters or another value), it may be considered that the at least one detected touch point is successfully matched with the standard touch point model; otherwise, it may be considered that the matching is failed.

In another embodiment of the present invention, a standard model, for example, includes a standard touch track model. Each standard touch track model, for example, may include at least one standard touch direction. For example, if a deviation between a touch direction that is determined, according to a detected touch track, by the triggering module 730 and one of standard touch directions included in a certain standard touch track model is less than a threshold (the threshold may be specifically set according to a specific scenario, for example the threshold is less than 5° or another value), it may be considered that the touch direction that is determined according to the detected touch track is successfully matched with the standard touch track model (that is to say, the detected touch track is successfully matched with the standard touch track model); otherwise, it may be considered that the matching is failed.

Alternatively, each standard touch track model, for example, may include at least one standard touch figure (such as a triangle, a quadrangle, a circle, or another figure). For example, if the similarity between a touch figure that is determined, according to the detected touch track, by the triggering module 730 and one of standard touch figures included in a certain standard touch track model is greater than a threshold (the threshold may be set according to a specific scenario, for example, the threshold is greater than 90% or another value), it may be considered that the touch figure that is determined according to the detected touch track is successfully matched with the standard touch track model (that is to say, the detected touch track is successfully matched with the standard touch track model); otherwise, it may be considered that the matching is failed.

Referring to FIG. 7-b, in an application scenario, a touch detecting module 720 may include:

a first touch detecting sub-module 721, configured to detect a touch ending point on a touch sensor 710 after an object is selected or is called.

A triggering module 730 may include:

a first triggering sub-module 731, configured to match the touch ending point detected by the first touch detecting sub-module 721 with at least one standard touch point model of a first type; and if the matching is successful, and the selected or called object can be used as a sent object of a communication application that corresponds to the successfully matched standard touch point model of the first type, trigger the communication application that corresponds to the successfully matched standard touch point model of the first type, and add the selected or called object as a to-be-sent object of the communication application, where different communication applications correspond to different standard touch point models of the first type.

For example, the first triggering sub-module 731 may specifically be configured to match the touch ending point detected by the first touch detecting sub-module 721 with a display location of at least one communication application icon that is displayed on the touch sensor; and if a distance between the touch ending point and a display location of one of communication application icons that are displayed on the touch sensor 710 is less than a first threshold, determine that the touch ending point is successfully matched with the display location of the communication application icon, where the distance between the touch ending point and the display location of the application icon is less than the first threshold, and if the selected or called object can be used as a sent object of a communication application that corresponds to the communication application icon that is at the successfully matched display location, trigger the communication application that corresponds to the communication application icon, and add the selected or called object as a to-be-sent object of the communication application.

Referring to FIG. 7-c, in another application scenario, a touch detecting module 720 may include:

a second touch detecting sub-module 722, configured to detect a touch starting point and a touch ending point on a touch sensor 710 after an object is selected or is called.

A triggering module 730 may include:

a second triggering sub-module 732, configured to match the touch starting point and the touch ending point with at least one standard touch point model of a second type, where the touch starting point and the touch ending point are detected by the second touch detecting sub-module 722; and if the matching is successful, and the selected or called object can be used as a sent object of a communication application that corresponds to the successfully matched standard touch point model of the second type, trigger the communication application that corresponds to the successfully matched standard touch point model of the second type, and add the selected or called object as a to-be-sent object of the communication application, where different communication applications correspond to different standard touch point models of the second type.

Referring to FIG. 7-d, in another application scenario, a touch detecting module 720 may include:

a third touch detecting sub-module 723, configured to detect a touch point on a touch sensor 710 after an object is selected or is called.

A triggering module 730 may include:

a third triggering sub-module 733, configured to match at least one touch point with at least one standard touch point model of a third type, where the at least one touch point is detected by the third touch detecting sub-module 723; and if the matching is successful, and the selected or called object can be used as a sent object of a communication application that corresponds to the successfully matched standard touch point model of the third type, trigger the communication application that corresponds to the successfully matched standard touch point model of the third type, and add the selected or called object as a to-be-sent object of the communication application, where different communication applications correspond to different standard touch point models of the third type.

For example, the third triggering sub-module 733 is specifically configured to match the at least one touch point with a display location of at least one communication application icon that is displayed on the sensor, where the at least one touch point is detected by the third touch detecting sub-module 723; and if a distance between one or multiple of the at least one detected touch point and a display location of one of communication application icons that are displayed on the touch sensor is less than a second threshold, determine that the at least one detected touch point is successfully matched with the display location of the communication application icon, where the distance between the at least one detected touch point and the display location of the communication application icon is less than the second threshold, and if the selected or called object can be used as a sent object of a communication application that corresponds to the communication application icon that is at the successfully matched display location, trigger the communication application that corresponds to the communication application icon, and add the selected or called object as a to be sent object of the communication application.

Referring to FIG. 7-e, in another application scenario, a touch detecting module 720 includes:

a fourth touch detecting sub-module 724, configured to detect a touch track on a touch sensor 710 after an object is selected or is called.

A triggering module 730 may include: a fourth triggering sub-module 734, configured to determine a touch direction that corresponds to the touch track detected by the fourth touch detecting sub-module 724, and match the determined touch direction with at least one standard touch track model of a first type; and if a deviation between the determined touch direction, and a standard touch direction included in one of the at least one standard touch track model of the first type is less than a third threshold, determine that the detected touch track is successfully matched with the at least one standard touch track model of the first type, and if the selected or called object can be used as a sent object of a communication application that corresponds to the successfully matched standard touch track model of the first type, trigger the communication application that corresponds to the successfully matched standard touch track model of the first type, and add the selected or called object as a to be sent object of the communication application, where different communication applications correspond to different standard touch track models of the first type.

Referring to FIG. 7-f, in another application scenario, a touch detecting module 720 includes:

a fourth touch detecting sub-module 724, configured to detect a touch track on a touch sensor 710 after an object is selected or is called.

A triggering module 730 may include: a fifth triggering sub-module 735, configured to determine a touch figure that corresponds to the touch track detected by the fourth touch detecting sub-module 724, and match the determined touch figure with at least one standard touch track model of a second type; and if the similarity between the determined touch figure and a standard touch figure included in one of the at least one standard touch track model of the second type is greater than a fourth threshold, determine that the detected touch track is successfully matched with the at least one standard touch track model of the second type, and if the selected or called object can be used as a sent object of a communication application that corresponds to the successfully matched standard touch track model of the second type, trigger the communication application that corresponds to the successfully matched standard touch track model of the second type, and add the selected or called object as a to-be-sent object of the communication application, where different communication applications correspond to different standard touch track models of the second type.

It can be understood that, the electronic device 700 in this embodiment, for example, may be the electronic device in the foregoing method embodiment, a function of each function module of the electronic device 700 may be specifically implemented according to the method in the foregoing method embodiment, and for its specific implementation process, reference may be made to relevant description in the foregoing method embodiment, which is not described herein again.

It can be seen from the foregoing that, the electronic device 700 in this embodiment detects a touch track or touch point on a touch sensor after an object is selected or is called; matches the detected touch track or touch point with at least one standard model; and if the matching is successful, and the selected or called object can be used as a sent object of a communication application that corresponds to the successfully matched standard model, triggers the communication application that corresponds to the successfully matched standard model, and adds the selected or called object as a to-be-sent object of the communication application, where different communication applications correspond to different standard models. With this solution, a communication application triggering mechanism is simplified, the electronic device may trigger a corresponding communication application as long as a user performs one operation, and the selected or called object is added as a to-be-sent object of the communication application, and therefore, user experience may be improved.

It should be noted that, terms of first, second, third, fourth, first type, and second type adopted in the description of the foregoing embodiments are not intended to limit a sequence, and are only described to facilitate differentiation.

In the foregoing embodiments, the description of each embodiment has its emphasis, and some embodiments may not be detailed. Reference may be made to the relevant description of other embodiments.

To sum up, according to the embodiments of the present invention, an electronic device that has a touch sensor detects a touch track or touch point on a touch sensor after an object is selected or is called; and matches the detected touch track or touch point with at least one standard model; and if the matching is successful, and the selected or called object can be used as a sent object of a communication application that corresponds to the successfully matched standard model, triggers the communication application that corresponds to the successfully matched standard model, and adds the selected or called object as a to-be-sent object of the communication application. Different communication applications correspond to different standard models. With the solutions, a communication application triggering mechanism is simplified, the electronic device may trigger a corresponding communication application as long as a user performs one operation, and the selected or called object is added as a to-be-sent object of the communication application, and therefore, user experience may be improved.

Persons of ordinary skill in the art may understand that all or a part of the steps of the method according to the embodiments of the present invention may be implemented by a program instructing relevant hardware. The program may be stored in a computer readable storage medium, and the storage medium may include: a read only memory, a random access memory, a magnetic disk, or an optical disk, and so on.

The communication application triggering method and the electronic device provided in the embodiments of the present invention are introduced in detail in the foregoing. A principle and an implementation manner of the present invention are described by using specific examples. The foregoing descriptions of the embodiments are merely for understanding the method and core ideas of the present invention. Meanwhile, persons of ordinary skill in the art may make modifications to the specific implementation manner and application scope according to the ideas of the present invention. To sum up, the content of the specification shall not be construed as a limitation to the present invention.

What is claimed is:

1. A communication application triggering method, wherein the method is applied to an electronic device that has a touch sensor, and method comprises:

detecting a touch track or touch point on the touch sensor after an object is selected or is called;

matching the detected touch track or touch point with at least one standard model, the at least one standard model comprising a standard touch point model or a standard touch track model; and if the matching is successful, and the object is used as a sent object of a communication application that corresponds to the successfully matched standard model, triggering the communication application that corresponds to the successfully matched standard model, and adding the object as a to-be-sent object of the communication application, wherein different communication applications correspond to different standard models; and wherein detecting, matching and triggering further comprise, (a) detecting a touch ending point on the touch sensor after an object is selected or is called; and matching the detected touch ending point with at least one standard touch point model of a first type; and if the matching is successful, and the object is used as a sent object of a communication application that corresponds to the successfully matched standard touch point model of the first type, triggering the communication application that corresponds to the successfully matched standard touch point model of the first type, and adding the object as a to-be-sent object of the communication application, wherein different communication applications correspond to different standard touch point models of the first type, wherein matching the detected touch ending point with a display location of at least one communication application icon that is displayed on the touch sensor; and if a distance between the touch ending point and a display location of one of communication application icons that are displayed on the touch sensor is less than a first threshold, determining that the touch ending point is successfully matched with the display location of the communication application icon, wherein the distance between the touch ending point and the display location of the application icon is less than the first threshold, and if the object is used as a sent object of a communication application that corresponds to the communication application icon that is at the successfully matched display location, triggering the communication application that corresponds to the communication application icon, and adding the object as a to-be-sent object of the communication application; or (b) detecting a touch starting point and a touch ending point on the touch sensor after an object is selected or is called; and matching the detected touch starting point and touch ending point with at least one standard touch point model of a second type, and if the matching is successful, and the object is used as a sent object of a communication application that corresponds to the successfully matched standard touch point model of the second type, triggering the communication application that corresponds to the successfully matched standard touch point model of the second type, and adding the object as a to-be-sent object of the communication application, wherein different communication applications correspond to different standard touch point models of the second type; or (c) detecting a touch point on the touch sensor after an object is selected or is called; and matching at least one detected touch point with at least one standard touch point model of a third type; and if the matching is successful, and the object is used as a sent object of a communication application that corresponds to the successfully matched standard touch point model of the third type, triggering the communication application that corresponds to the successfully matched standard touch point model of the third type, and adding the object as a to-be-sent object of the communication application, wherein different communication applications correspond to different standard touch point models of the third type, wherein matching the at least one detected touch point with a display location of at least one communication application icon that is displayed on the touch sensor, and if a distance between one or multiple of the at least one detected touch point and a display location of one of communication application icons that are displayed on the touch sensor is less than a second threshold, determining that the at least one detected touch point is successfully matched with the display location of the communication application icon, wherein the distance between the at least one detected touch point and the display location of the communication application icon is less than the second threshold, and if the object is used as a sent object of a communication application that corresponds to the communication application icon that is at the successfully matched display location, triggering the communication application that corresponds to the communication application icon, and adding the object as a to-be-sent object of the communication application.

2. The method according to claim 1, wherein the detecting a touch track or touch point on the touch sensor after an object is selected or is called; and matching the detected touch track or touch point with at least one standard model; and if the matching is successful, and the object is used as a sent object of a communication application that corresponds to the successfully matched standard model, triggering the communication application that corresponds to the successfully matched standard model, and adding the object as a to-be-sent object of the communication application, wherein different communication applications correspond to different standard models, comprises:

detecting a touch track on the touch sensor after an object is selected or is called, determining a touch direction that corresponds to the detected touch track, and matching the determined touch direction with at least one standard touch track model of a first type; and if a deviation between the determined touch direction and a standard touch direction comprised in one of the at least one standard touch track model of the first type is less than a third threshold, determining that the detected touch track is successfully matched with the at least one standard touch track model of the first type, and if the object is used as a sent object of a communication application that corresponds to the successfully matched standard touch track model of the first type, triggering the communication application that corresponds to the successfully matched standard touch track model of the first type, and adding the object as a to-be-sent object of the communication application, wherein different communication applications correspond to different standard touch track models of the first type; or detecting a touch track on the touch sensor after an object is selected or is called, determining a touch figure that corresponds to the detected touch track, and matching the determined touch figure with at least one standard touch track model of a second type; and if the similarity between the determined touch figure and a standard touch figure comprised in one of the at least one standard touch track model of the second type is greater than a fourth threshold, determining that the detected touch track is successfully matched with the at least one standard touch track model of the second type, and if the object is used as a sent object of a communication application that corresponds to the successfully matched standard touch track model of the second type, triggering the communication application that corresponds to the successfully matched standard touch track model of the second type, and adding the object as a to-be-sent object of the communication application, wherein different communication applications correspond to different standard touch track models of the second type.

3. The method according to claim 1, wherein the communication application comprises at least one of the following applications: a short message application, a multimedia message application, an electronic mail application, a real-time communication application, a social application, an infrared application, a bluetooth application, a wifi application, or an application of storage in a storage device.

4. The method according to claim 1, wherein the object comprises at least one of the following: a file, a file clip, a file folder, or a character clip.

5. An electronic device, comprising:
a touch sensor;
a touch detecting module, configured to detect a touch track or touch point on the touch sensor after an object is selected or is called; and
a triggering module, configured to match the touch track or touch point with at least one standard model, the at least one standard model comprising a standard touch point model or a standard touch track model, wherein the touch track or touch point is detected by the touch detecting module; and if the matching is successful, and the object is used as a sent object of a communication application that corresponds to the successfully matched standard model, trigger the communication application that corresponds to the successfully matched standard model, and add the object as a to-be-sent object of the communication application, wherein different communication applications correspond to different standard models; and
(a) wherein the touch detecting module comprises a first touch detecting sub-module, configured to detect a touch ending point on the touch sensor after an object is selected or is called; and the triggering module comprises:

a first triggering sub-module, configured to match the touch ending point with at least one standard touch point model of a first type, wherein the touch ending point is detected by the first touch detecting sub-module; and if the matching is successful, and the object is used as a sent object of a communication application that corresponds to the successfully matched standard touch point model of the first type, trigger the communication application that corresponds to the successfully matched standard touch point model of the first type, and add the object as a to-be-sent object of the communication application, wherein different communication applications correspond to different standard touch point models of the first type, wherein the first triggering sub-module is configured to match the touch ending point with a display location of at least one communication application icon that is displayed on the touch sensor, wherein the touch ending point is detected by the first touch detecting sub-module; and if a distance between the touch ending point and a display location of one of communication application icons that are displayed on the touch sensor is less than a first threshold, determine that the touch ending point is successfully matched with the display location of the communication application icon, wherein the distance between the touch ending point and the display location of the application icon is less than the first threshold, and if the object is used as a sent object of a communication application that corresponds to the communication application icon that is at the successfully matched display location, trigger the communication application that corresponds to the communication application icon, and add the object as a to-be-sent object of the communication application; or (b) wherein the touch detecting module comprises a second touch detecting sub-module, configured to detect a touch starting point and a touch ending point on the touch sensor after an object is selected or is called; and the triggering module comprises:

a second triggering sub-module, configured to match the touch starting point and the touch ending point with at least one standard touch point model of a second type, wherein the touch starting point and the touch ending point are detected by the second touch detecting sub-module; and if the matching is successful, and the object is used as a sent object of a communication application that corresponds to the successfully matched standard touch point model of the second type, trigger the communication application that corresponds to the successfully matched standard touch point model of the second type, and add the object as a to-be-sent object of the communication application, wherein different communication applications correspond to different standard touch point models of the second type; or (c) wherein the touch detecting module comprises a third touch detecting sub-module, configured to detect a touch point on the touch sensor after an object is selected or is called; and the triggering module comprises:

a third triggering sub-module, configured to match at least one touch point with at least one standard touch point model of a third type, wherein the at least one touch point is detected by the third touch detecting sub-module; and if the matching is successful, and the object is used as a sent object of a communication application that corresponds to the successfully matched standard touch point model of the third type, trigger the communication application that corresponds to the successfully matched standard touch point model of the third type, and add the object as a to-be-sent object of the communication application, wherein different communication applications correspond to different standard touch point models of the third type, wherein the third triggering sub-module is configured to match the at least one touch point with a display location of at least one communication application icon that is displayed on the touch sensor, wherein the at least one touch point is detected by the third touch detecting sub-module; and if a distance between one or multiple of the at least one detected touch point and a display location of one of communication application icons that are displayed on the touch sensor is less than a second threshold, determine that the at least one detected touch point is successfully matched with the display location of the communication application icon, wherein the distance between the at least one detected touch point and the display location of the communication application icon is less than the second threshold, and if the object is used as a sent object of a communication application that corresponds to the communication application icon that is at the successfully matched display location, trigger the communication application that corresponds to the communication application icon, and add the object as a to-be-sent object of the communication application.

6. The electronic device according to claim 5, wherein the touch detecting module comprises:

a fourth touch detecting sub-module, configured to detect a touch track on the touch sensor after an object is selected or is called; and the triggering module comprises:

a fourth triggering sub-module or a fifth triggering sub-module, wherein the fourth triggering sub-module is configured to determine a touch direction that corresponds to the touch track detected by the fourth touch detecting sub-module, and match the determined touch direction with at least one standard touch track model of a first type; and if a deviation between the determined touch direction and a standard touch direction comprised in one of the at least one standard touch track model of the first type is less than a third threshold, determine that the detected touch track is successfully matched with the at least one standard touch track model of the first type, and if the object is used as a sent object of a communication application that corresponds to the successfully matched standard touch track model of the first type, trigger the communication application that corresponds to the successfully matched standard touch track model of the first type, and add the object as a to-be-sent object of the communication application, wherein different communication applications correspond to different standard touch track models of the first type; and the fifth triggering sub-module is configured to determine a touch figure that corresponds to the touch track detected by the fourth touch detecting sub-module, and match the determined touch figure with at least one standard touch track model of a second type; and if the similarity between the determined touch figure and a standard touch figure comprised in one of the at least one standard touch track model of the second type is greater than a fourth threshold, determine that the detected touch track is successfully matched with the at least one standard touch track model of the second type, and if the object is used as a sent object of a communication application that corresponds to the successfully matched standard touch track model of the second type, trigger the communication application that corresponds to the successfully matched standard touch track model of the second type, and add the object as a to-be-sent object of the communication application, wherein different communication applications correspond to different standard touch track models of the second type.

* * * * *